Feb. 27, 1968   W. C. SWANSON ET AL   3,370,424
HYDROSTATIC TRANSMISSION DRIVE PUMP SWASH PLATE CONTROL
Filed March 7, 1966   3 Sheets-Sheet 1

Inventors:
William C. Swanson
Marvin D. Jennings
By Walter G. Geavy
Atty.

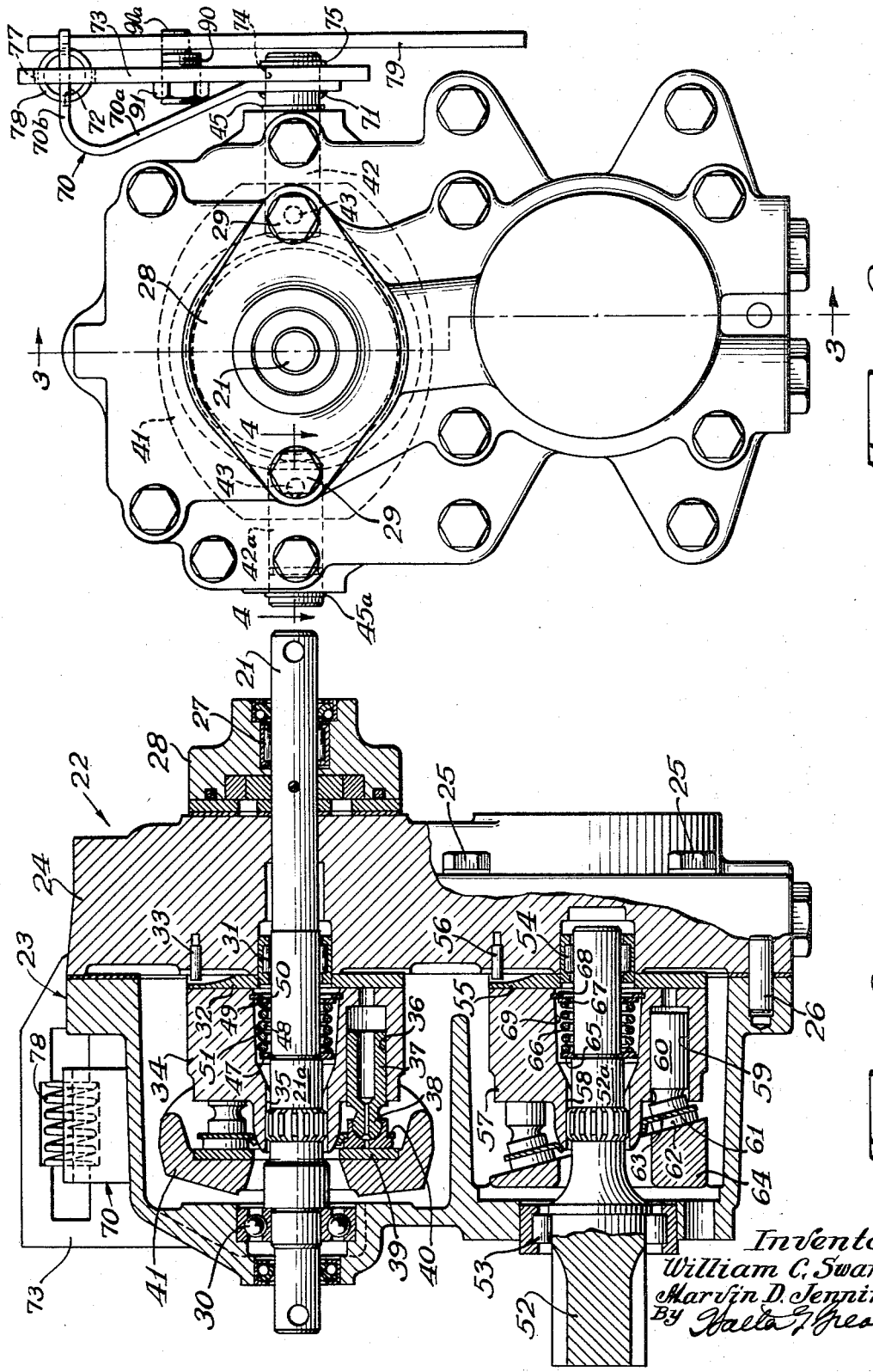

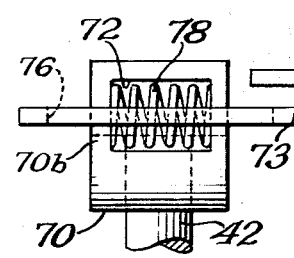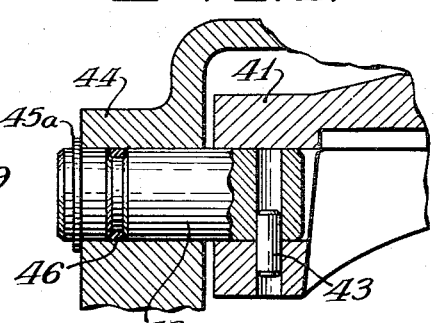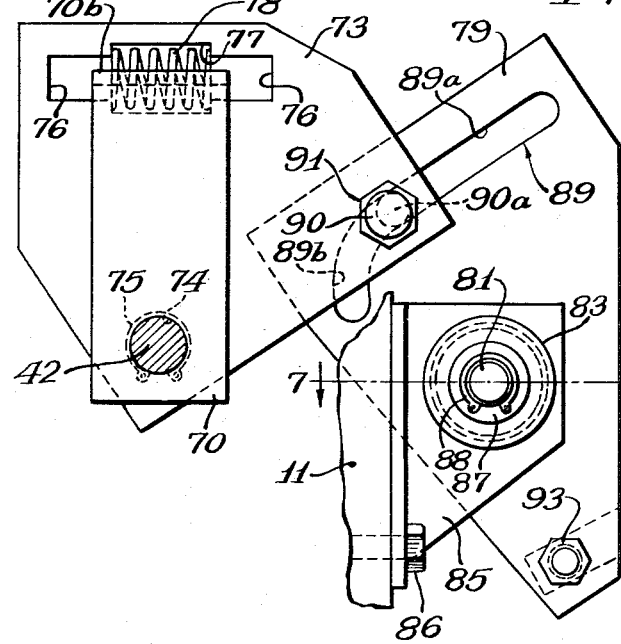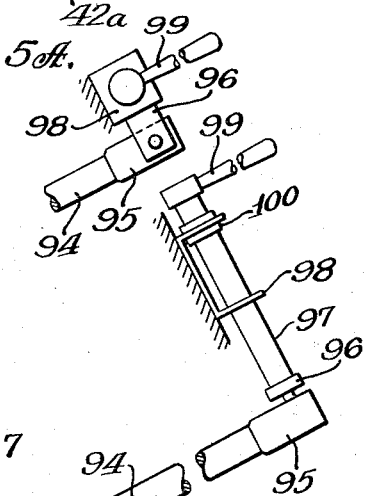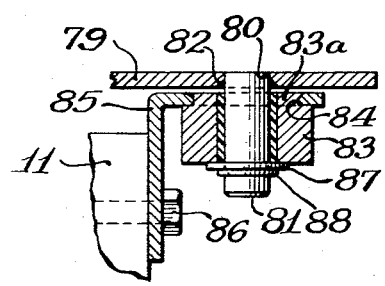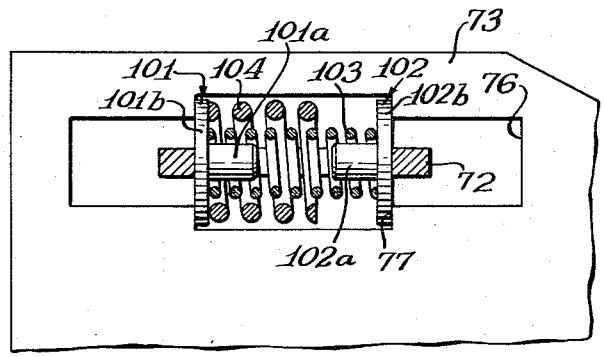

United States Patent Office 3,370,424
Patented Feb. 27, 1968

3,370,424
HYDROSTATIC TRANSMISSION DRIVE PUMP SWASH PLATE CONTROL
William C. Swanson, Clarendon Hills, and Marvin D. Jennings, Naperville, Ill., assignors to International Harvester Company, Chicago, Ill., a corporation of Delaware
Filed Mar. 7, 1966, Ser. No. 532,256
10 Claims. (Cl. 60—53)

ABSTRACT OF THE DISCLOSURE

A hydrostatic transmission drive pump swash plate control including a driven arm and a drive plate coaxially carried by a shaft secured to the swash plate, the drive plate being rotatably mounted on the shaft and the drive arm being secured to the shaft for rotation therewith, bias means interposed between the drive plate and the driven arm, a second plate having a cam slot mounted for rotation about an axis parallel to the shaft, a cam follower carried by the driven plate member and engageable with the cam slot, and linkage means operably connecting second plate member to an operator control lever.

---

This invention relates to control mechanisms for hydraulic pumps, and more particularly to a control mechanism for the swash plate of a hydraulic drive pump incorporated as a component in a hydrostatic transmission unit.

In hydrostatic transmission units the swash plate of the hydraulic drive pump is customarily rotatable about an axis transverse to the axis of rotation of axially displaceable piston elements of said pump so as to provide a variable output from the pump as well as to control the directional flow of fluid therefrom whereby the direction of rotation of an associated fluid motor, frequently employed for propelling a vehicle, is controlled. Heretofore, in transmissions of this type, since the control mechanism therefor was frequently of the fixed linkage type, road shocks were readily transmitted through the rear wheels into the hydrostatic loop and to the vehicle operator thus causing undesirable discomfort to the operator thereof. Likewise in such prior transmissions although the desirability of providing smooth and uniform movements of the swash plate, in order to provide smooth and uniform acceleration and deceleration of the associated vehicle thereby minimizing the shocking and jerking motions being imparted thereto, was well known, it has not heretofore been possible to accomplish this desirable objective. Prior control mechanisms usually operated to cause a fast or sharp breakaway from neutral toward running speed and this resulted in a shock or jerking action upon the start of movement of the vehicle. The present invention thus is intended to provide a control mechanism of a type which overcomes the hereinabove noted drawbacks of prior hydrostatic transmission units.

The primary object, therefore, is to provide control means for imparting smooth angular displacement to the rotatable swash plate of the hydraulic drive pump of a hydrostatic transmission unit.

Another object is to provide, in a hydrostatic transmission unit incorporated in a vehicle, a control means which is highly effective for minimizing the transfer of road shocks to the vehicle operator through the transmission unit thereof.

A further important object is to provide novel manually operable mechanical linkage means for controlling the angular displacement of the swash plate in the pump of a hydrostatic transmission whereby smooth and uniform acceleration and deceleration of an associated vehicle is effectively obtained.

A still further object is to provide means for controlling angular displacement of the swash plate of a hydraulic drive pump including linkage mechanism having three operatively interconnectable members with the first and second of said members being connected through cam and follower means while a second and third of said members are resiliently connected through yieldably engageable means.

An important object is to provide control means wherein when the control handle is moved by an operator at a substantially uniform rate of displacement there is imparted a non-uniform rate of displacement to the rotatable swash plate of the hydraulic drive pump in a hydrostatic transmission unit.

The foregoing and other objects and features of the invention will become apparent as the disclosure is more fully made in the following detailed description of a preferred embodiment of the invention as illustrated in the accompanying sheets of drawings in which:

FIGURE 2 is an end elevational view of a hydrostatic transmission unit and showing in end elevation portions of the proposed invention;

FIGURE 3 is a vertical sectional view taken generally along the line 3—3 of FIGURE 2;

FIGURE 4 is a fragmentary sectional view taken generally along the line 4—4 of FIGURE 2;

FIGURE 5 is a side elevational view of the proposed linkage control mechanism with portions thereof being shown generally schematically;

FIGURE 5a is a fragmentary end view of a portion of the handle control part of the mechanism;

FIGURE 6 is a somewhat fragmentary top plan view of the mechanism shown in the preceding view;

FIGURE 7 is a fragmentary sectional view taken generally along the line 7—7 of FIGURE 5; and FIGURE 8 is a fragmentary elevational view of a modified form of the spring means yieldably interconnecting components of the proposed mechanism.

Figure 1:
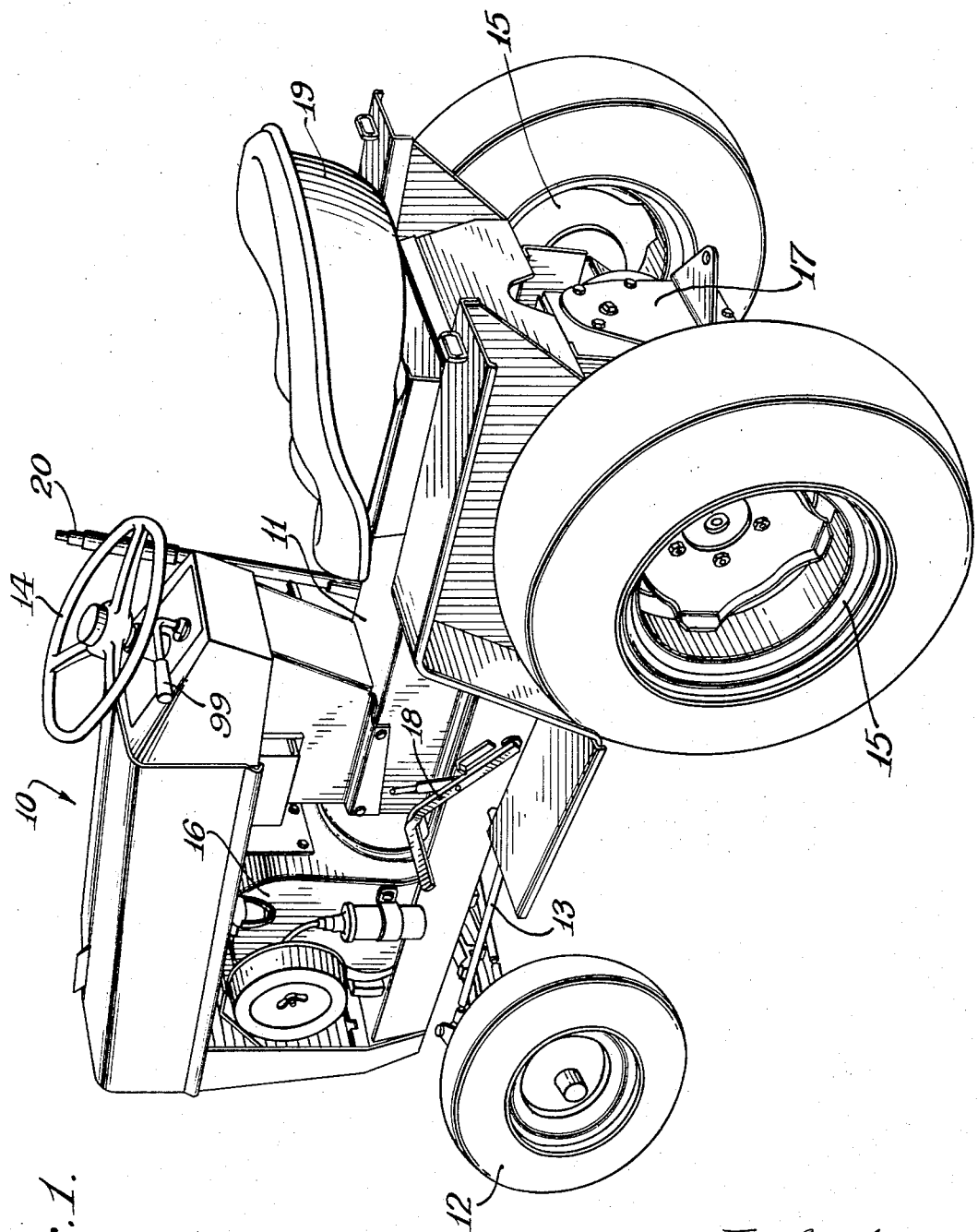
FIGURE 1 is a perspective view of a vehicle of the type that may be equipped with the proposed control mechanism.

Referring now to the drawings it will be seen that the proposed invention is illustrated in association with a tractor vehicle, indicated generally by the reference numeral 10, having a frame 11, front mounted steerable wheels 12 (only one of which is seen) operable through a linkage mechanism 13 interconnected with an operator controlled steering wheel 14. A pair of rear drive or traction wheels 15, 15 suitably supporting the frame by means not shown are operatively interconnected to one another and to the engine 16 by a differential final drive unit 17 of generally conventional construction, and a brake pedal 18 interconnects by suitable linkage with braking means not shown for braking the rear wheels 15, 15. A suitable seat such as shown at 19 is also provided as well as a control lever 20 adapted for connection by suitable linkage mechanism not shown for operating implement hitching mechanism that may optionally be mounted on the vehicle. Since many of the foregoing components form no particular function in connection with the proposed invention, further detailing or illustrating the construction thereof is believed unnecessary to a proper understanding of the instant invention.

The engine 16 may be operatively connected by suitable driving means not shown to a drive shaft 21 that extends into a hydrostatic transmission unit, indicated generally by the reference numeral 22 (FIGS. 2 and 3), suitably carried by the frame 11 by means not shown. Said transmission unit will be seen to include a housing 23 and a cover plate 24 detachably secured thereto and aligned therewith by any suitable means such as the bolts 25 and the aligning pins 26. Shaft 21 which may extend through the transmission and out beyond the opposite side thereof may have the oppositely extending end of the shaft adapted for connection by suitable means to the power take-off mechanism (not shown) with which such vehicles are frequently equipped. Said shaft is journalled at one end by suitable bearing means 27 disposed in a bearing plate 28 suitably affixed to cover plate 24 by fastening bolts 29, and the opposite end is journalled by a bearing 30 mounted in housing 23, while an intermediate portion of said shaft may be journalled as shown by a bearing 31 mounted in cover plate 24. Bearing 31 may also be employed to support in pilot fashion a valve plate 32 which may be constrained against rotation about shaft 21 by a pin 33 mounted in cover plate 24. A cylinder block or barrel member 34 is mounted by splines such as 35 on shaft 21 and constrained for rotation therewith. Said barrel member is fashioned to provide a plurality of axially extending cylinders such as shown at 36 each of which is adapted to reciprocally receive a piston 37 therein while the outer ends of said pistons are suitably mounted by ball and socket means such as indicated at 38 in a slipper member 39 covered with a slipper retainer 40. The slipper member 39 is disposed in abutting and sliding contact relation with a swash plate member 41.

Swash plate 41 is mounted on trunnion shafts such as 42, 42a and constrained for rotation therewith by suitable means such as the pins 43. The trunnion shafts, in turn, are journalled at 44, 44a in housing 23 and snap rings 45, 45a, positioned over outwardly extending end portions of said trunnion shafts in well known fashion, serve to limit axial displacement of these shafts. Suitable liquid seals such as seen at 46 may be provided one on each of said trunnion shafts to limit flow of fluid therealong as is well understood.

An enlarged portion 21a of shaft 21 provides a shoulder that abuttingly receives a washer-like member 47 that abuttingly engages one end of a spring 48 the opposite end of which spring abuts a washer-like member 49 that in turn abuts a snap ring 50 disposed in an annular recess in a bore 51 provided in the barrel member 34, and the reaction of said spring serves to maintain barrel member 34, valve plate 32 and the cover plate member 24 in closely abutting relation as is well understood for such devices. The foregoing comprises the hydraulic drive pump component of the transmission unit.

Also disposed within housing 23 and cover plate 24 is the hydraulic motor component of the transmission unit and fashioned as hereinafter described. A shaft 52 having one end thereof extending outwardly through housing 23 is journalled by a bearing 53 mounted in the housing, while the opposite end of the latter shaft is journalled by a bearing 54 mounted in a recess in cover plate 24. Bearing 54 may also be employed to support in pilot fashion a valve plate 55 which may be constrained against rotation about shaft 52 by the pin 56 mounted in cover plate 24. A cylinder block or barrel member 57 is mounted by splines such as 58 on shaft 52 and constrained for rotation therewith. The latter barrel member is fashioned to provide a plurality of axially extending cylinders such as shown at 59 each of which is adapted to reciprocally receive a piston 60 therein while the outer ends of the latter pistons are suitably mounted by ball and socket means such as indicated at 61 in a slipper member 62 covered with a slipper retainer 63. Slipper member 62 is disposed in abutting and sliding engagement with an inclined swash plate 64 encircling shaft 52 and, in turn, fixedly supported by housing 23 by suitable means not shown. An enlarged portion 52a of shaft 52 provides an abutting shoulder that receives a washer-like member 65 that abuttingly engages one end of a spring 66 the opposite end of which spring abuts a washer-like member 67 that in turn abuts a snap ring 68 disposed in an annular recess in a bore 69 provided in barrel member 57 and in a fashion similar to that heretofore noted in connection with the pump component, the reaction of spring 66 serves to maintain barrel member 57, valve plate 55 and the cover plate member 24 in closely abutting relation as is well understood. The immediately preceding described component comprises the hydraulic motor of the transmission unit and the outwardly extending end of shaft 52 thereof is adapted for operative drive connection, by suitable means not shown, with the differential rear wheel drive unit indicated generally by reference numeral 17.

It will be understood that suitable fluid-carrying conduits or passages will be provided interconnecting the valve plate elements of the hydraulic pump and motor components as well as for connecting the transmission unit to the remainder of the hydraulic system (not shown) all of which are in accordance with well known practices in the art and since these particular elements constitute no specific part of the present invention a detailed showing and resume of the construction and disposition thereof was believed unnecessary to a complete understanding of the invention.

Now in accordance with the specific teachings of the invention, which envisages control mechanism for controlling a transmission unit such as hereinabove described, there is provided a driven arm member 70 that is mounted on an outwardly extending end portion of the trunnion shaft 42 and is constrained for rotation therewith by suitable means such as the welds indicated at 71. Said arm may be fashioned, as shown in FIGURE 2, to provide a generally vertically extending portion 70a with a portion 70b extending horizontally from the upper end of portion 70a and having a rectangular shaped slot or opening 72 proximate the free end of horizontal portion 70b. A drive plate member 73 has an aperture 74 therein dimensioned to permit said plate being rotatably positioned over the outwardly extending end portion of trunnion shaft 42, and a snap ring such as 75 on shaft 42 operates to fixedly position said plate in closely abutting relation with a portion of the driven arm 70. A rectangular slot or opening 76 provided in drive plate 73 is positioned and dimensioned to loosely accommodate the insertion therethrough of the slotted end portion 70b of arm 70. A second or secondary slotted opening 77 in drive plate 73 is dimensioned so that the length thereof generally corresponds with the long dimension of slot 72 in arm 70 and is adapted to receive a coil spring such as 78 in a slightly prestressed or preloaded condition therein. Although the degree of amount of such preloading may be varied according to individual circumstances it has been found that a loading of from 4 to 5 pounds has proven quite satisfactory for the proposed application. It will be appreciated, also, that a variable rate spring such as the well known conical shaped helical coil spring may be substituted for the cylindrical shaped spring illustrated herein without deviating from the teachings of the inventive concepts envisaged herein.

A cam plate 79 has an aperture 80 therein that receives a reduced section end portion of a stud 81 which is fixedly secured therein by any suitable means such as the welds indicated at 82. A bushing 83, of suitable material such as nylon or the like, slipped over stud 81 has a reduced section portion 83a on one end thereof that fits into an aperture 84 in a support bracket 85 mounted by suitable means such as the bolts 86 on frame 11. A back-up washer or retainer 87 and snap ring 88 may be provided to retain bushing 83 in position. Cam plate 79 is also provided with a cam slot 89 having a straight portion 89a joining a curved portion 89b at one end thereof. Slidably disposed in said cam slot is a follower member comprising a threaded stud 90 threadably mounted in drive plate 73 with an adjusting nut 91 on one end thereof and having an off-set or eccentrically disposed extension portion 90a on the opposite end of the stud which is dimensioned to slide in the cam slot 89.

The cam slot 89 is so designed that when the follower element is in the portion 89a thereof the swash plate will be tilted to provide forward drive for the vehicle and the length of the slot is correlated with the degree of swash plate tilt required to produce the maximum vehicle speed in the forward direction. The profile of this portion of the slot in the cam plate is such that the rate of change or displacement of the follower element will be non-uniform, and the profile additionally is such that the rate of change initially when moving away from neutral is very small but such rate of change gradually increases as the cam plate is rotated and the vehicle speed is increased. In this manner the initial movement of the swash plate away from the neutral position thereof is very smooth and slow thus minimizing the starting shock pressures in the hydrostatic loop of the transmission. The portion 89b of said cam slot is correlated with the tilt of the swash plate to produce movement of the vehicle in the reverse direction, and since it is desirable that the maximum speed of the vehicle in reverse be approximately one-half that of the forward speed the swash plate need be tilted through a much smaller angle than for forward drive. Accordingly the length of the cam slot for reverse direction operation is considerably less than that for forward operation. Likewise, since the maximum speed in reverse is less than the forward maximum speed the profile of the cam slot portion 89b is designed so that the change or angular displacement may be somewhat less and the cam slot portion 89b is fashioned to accommodate this difference.

Because of the well known mechanical and hydraulic characteristic of hydrostatic transmissions it is occasionally necessary to effect adjustment of the hydraulic and mechanical neutral position in order to avoid creep of the vehicle. Accordingly the eccentrically disposed portion 90a of follower stud 90 may be rotated by temporarily backing off nut 91 and thereby permit adjusting the hydraulic neutral point by varying the relative positions of the interconnected cam plate 79 and drive plate 73. Adjustment for obtaining mechancal neutral may then be undertaken by modifying the length of the linkage interconnecting the cam plate with the control handle to be hereinafter described. However, it will be appreciated other means may be suggested for affecting such neutral point adjustment, one such means for which is discussed in copending U.S. application Serial No. 532,217, hence the follower member 90 need not have an eccentric portion engaging cam slot 89 but may employ a non-adjustable stud follower without such eccentric portion and still have a mechanism embraced by the teachings of the instant invention.

A ball joint coupling 92 may be secured by suitable fastening means such as indicated generally at 93 to the end of cam plate 79 opposite of that containing cam slot 89, and said coupling in turn is adjustably connected to one end of a rod or link member 94 the opposite end of which rod is adjustably connected to a ball joint coupler 95. Coupler 95 is suitably affixed to one end of a link or lever 96 the opposite end of which is fixedly mounted on a shaft 97 and constrained for rotation therewith. Shaft 97 is rotatably mounted in a bracket 98 suitably mounted on frame 11 and a control handle 99 extending from the outer end of said shaft provides a means for operator control thereof. Suitable friction means such as indicated at 100 may be provided to aid in retaining the control handle in any one of a plurality of rotatively displaced positions as is well known for similar mechanisms.

In FIGURE 8 there is illustrated a modified form of the spring means employed for interconnecting the driven arm and drive plate members. In this view like elements are designated with the same reference numerals as employed in the first shown spring means. Drive plate 73 includes the primary slot 76 and secondary solt 77 while the driven arm member 70 is fashioned with the slot 72 therein. A pair of button-like members 101, 102 are positioned in slots 72 and 77 with one each such member disposed at opposite ends of slot 77. A coil spring 103 of light resistance is positioned over outwardly extending portions 101a and 102a of said buttons while opposite ends of said spring abuttingly engage flange portions 101b and 102b of said buttons. It will be understood, of course, that said spring is so positioned in a lightly loaded or pre-stressed condition as heretofore discussed in connection with the first preferred spring embodiment described herein. Positioned so as to circumscribe spring 103 is a spring 104 of considerably heavier resistance than spring 103. Spring 104 is shorter in length than the spring 103 and will not extend far enough to abut both button flange portions 101b and 102b when the intersecting members 70 and 73 are disposed in neutral position. Hence initial movement of arm 70 relative to plate 73 is resisted only by the spring 103, but when this displacement exceeds a predetermined amount the buttons 101 and 102 are additionally brought into engagement with opposite ends of spring 104 whereupon further movement of said arm and plate members is then resisted by both of said springs to produce a spring rate that may be said to be non-uniform.

*Operation*

Since the details of operation of hydrostatic transmissions are so well known to those skilled in the art, and since the hydraulic pump and motor components illustrated herein are generally conventional it is believed that no detailed elaboration of these operations need be recited herein. Suffice it to say that operation of shaft 21 by engine 16 actuates the associated hydraulic pump and provides a flow of fluid in the hydrostatic loop interconnecting said pump and the hydraulic motor whereupon the flow of fluid in said motor displaces the piston elements 60 therein and their reaction against the fixed swash plate 64 causes barrel member 57 and output shaft 52 to rotate at the speed and in the direction desired. Since shaft 52 is drivingly connected through the final drive differential unit 17 to the rear drive wheels 15, 15 the operation of said shaft effects a corresponding movement of said wheels and propulsion of the vehicle. The position of the swash plate 41, as is well known, determines the output of the hydraulic drive pump unit which varies with the degree said swash plate is tilted away from its neutral position, which is one wherein said swash plate is substantially normal to the axis of rotation of barrel member 34. As this output varies so does the output or drive of the hydraulic motor of the transmission, hence the power transmitted to the drive wheels will be varied in accordance therewith. The direction of drive transmitted to the drive wheels 15, 15 is, of course, determined by the direction of flow of fluid in the hydrostatic loop interconnecting the pump and motor components of the transmission unit and this, in turn, is determined by the forward or rearward tilt of the swash plate 41 away from its neutral position.

When control handle 99 is rotated to effect a desired change in the output of the transmission unit said rotative movement is translated by the shaft 97, lever 96 and connecting rod 94 into rotative movement of the cam plate 79 which thereupon rotates about the axis of its pivoting stud 81. As said cam plate is rotated the follower member 90a being delimited by cam slot 89 is forced to follow the profile of said slot which results in causing said follower to rotate about the axis of shaft 42 carrying with it the connected drive plate member 73. Since drive plate 73 is interlockingly connected by the spring means 78 with driven arm 70 any movement of said plate will tend to correspondingly move said driven arm together with its fixedly coupled trunnion shaft 42 about the axis of the latter shaft whereupon swash plate 41 which is also fixedly coupled to this trunnion shaft will be tiltably rotated to correspond with such movement. It will be seen that rotation of handle 99 in one direction from neutral will cause rotation of arm 70 and tilt of swash plate 41 in one direction, while an opposite movement of said control handle will cause a tilt of the swash plate in an opposite direction. Rotative movement of drive plate 73 is transmitted by way of spring member 78 to the driven arm 70 but any attempt to rotate drive plate 73 by movement of driven arm 70 is resisted by the interlocking one-way action of follower 90a in cam slot 89 and supplemented by the reactive force of spring element 78. When the force tending to rotate driven arm 70 is sufficient to overcome the resistance of said spring said arm becomes free to move within slot 76 a considerable distance without causing unnecessary strains in the drive plate 73 and its interconnected mechanism. When the force which caused movement of arm 70, such for instance as an increased load on the transmission is reduced, spring 78 then becomes effective to return said arm to its initial position whereupon the swash plate is also returned to its initial position. On the other hand initial movement of drive plate 73 by virtue of movement transmitted to said plate from cam plate 79 may be resisted by driven arm 70 whereupon spring 78 may be initially depressed or partially collapsed without causing damage to the mechanism.

Although the ideal objective would be to rotate the swash plate slowly, smoothly and at a uniform rate it is physically not possibly to do so and the use of the spring as proposed functions to absorb the shocks usually encountered and reulting from the inherent inability to accomplish the ideal in operating mechanisms provided for such purposes. The spring rate of compression spring 78 is so designed as to allow drive plate 73 to be rotated about trunnion shaft 42 in a non-uniform rate of change and thus allow the net force output of said spring to be of a relatively uniform transmittal against arm 70 to overcome the loads imposed on swash plate 41 and produce smooth starting and stopping of the hydrostatic transmission output shaft 52. Thus it will be seen that the proposed arrangement provides a novel mechanical means that permits an operator to impart a smooth angular displacement to the swash plate of the hydraulic pump in a hydrostatic transmission thereby reducing shock pressures in the associated hydrostatic loop to an acceptable level.

It will be seen also that the use of the yieldable spring element as proposed herein between the drive plate and driven arm members provides a means for limiting the effect of hunting which frequently is objectionable at low speeds in the pump of such a transmission unit.

An additional accomplishment of the proposed control mechanism is that it functions both in acceleration and deceleration of the transmission as well as for forward and reverse direction of travel of the vehicle in which the transmission is mounted. A further advantage of the proposed mechanism is that it functions to cushion shocks transmitted through the drive wheels into the hydrostatic loop; which normally, in a fixed linkage type of control, would result in the shocks being transmitted to the vehicle operator. Furthermore, in the proposed arrangement if the drive pressure in the pump exceeds a predetermined point, the imposed load on the swash plate will increase causing the spring to partially collapse; in turn reducing the vehicle speed and load on the drive pump.

While certain representative embodiments and details have been shown for the purpose of illustrating the invention, it will be apparent to those skilled in this art that various changes and modifications may be made thereon without deviating from the spirit or scope of the invention.

What is claimed is:

1. In a hydraulic pump and motor transmission system having a swash plate in the pump thereof tiltable about an axis in one direction from a neutral position for varying the transmission ratio of the system with the motor thereof rotating in one direction and tiltable about the same axis in an opposite direction from a neutral position for varying the transmission ratio of the system with the motor thereof rotating in an opposite direction, a control mechanism, comprising: first, second and third members; cam and follower means interconnecting said first and second members and operative for translating movements of said first to said second member; resilient means interposed between said second and third members yieldably interlocking the latter members for limited relative rotative movement therebetween; means rotatably mounting said first member on a support having an axis parallel to and spaced from the axis about which said swash plate tilts, and having said second member mounted for rotation about the later axis; means constraining said third member for rotative movement with the tilting movement of said swash plate; and control handle means rotatably mounted on a support and pivotally connected to said first member and operative for selectively positioning the swash plate in any one of a plurality of positions for establishing corresponding transmission ratio settings for the system.

2. The invention described in claim 1, but further characterized in that the resilient means interposed between said second and third members includes coil-spring means insertably retained in aligned slotted-openings fashioned one opening in each of second and third members for transmitting motion from one of said members to the other thereof but being yieldable to provide a limited amount of relative movement between said two members.

3. The invention described in claim 2, and further characterized in that said aligned slotted openings are fashioned in portions of the respective members angularly disposed relative to one another and having the portion of said third member containing the slot therein insertably disposed in the slot fashioned in said second member.

4. The invention described in claim 3, but further characterized in that said slotted openings are fashioned with surfaces for abuttingly receiving opposite ends of the spring means and certain of which surfaces are so dimensioned as to abuttingly accommodate said spring means normally therebetween in a prestressed condition.

5. In a hydraulic pump and motor transmission system, the combination with said system of movable control means for varying the transmission ratio in a plurality of settings while minimizing the transfer of shocks through said transmission system to the operator, said control means including a shaft directly connected to one of said pump and motor, and rotatable to effect changes in said ratio; first, second and third members mounted for pivotal movement; said third member being secured to said shaft for rotation therewith; bias means interconnecting said second and third members for urging said third member into a given position relative to said second member but yieldable to permit relative movement therebetween in either direction from said given position; cam and follower means interconnecting said second and first members; and control handle means operatively connected to said first member for rotation thereof whereby said ratio may be varied.

6. The invention according to claim 5, further characterized in that said second member is carried by said shaft and is supportably mounted for rotative movement relative to said shaft.

7. The invention according to claim 5, further characterized in that the cam and follower means comprises a cam slot fashioned in one of said first and second members and a follower element mounted in the other of said first and second members and disposed to extend in said cam slot for translating the movement of said one member to said other member, and having the profile of said cam slot fashioned so as to be operative for converting a uniform rate of change of angular movement of said first member to a non-uniform rate of change of angular movement of said second member.

8. The invention according to claim 7, further characterized in that said follower element includes a portion adjustably mounted in said one member with a smaller diametered portion extending therefrom that extends into said slot and having the latter portion eccentrically disposed relative to the axis of the portion for which said latter portion extends.

9. The invention according to claim 6, further characterized in that the bias means interconnecting said second and third members mounted for movement about the same axis includes pre-loaded coil spring means comprising a spring of light resistance disposed within a spring of heavier resistance and insertably retained in aligned slotted openings fashioned one in each of said second and third members in portions of the respective members which are angularly disposed to and in intersecting relation one to the other and operative so that initial resistance to the movement of said second and third members relative to each other is effected by the light resistance spring and upon movement beyond a predetermined amount the resistance to movement is supplemented by the spring of heavy resistance.

10. A control mechanism, comprising: first, second and third members; said first member being rotatably mounted on a support about a first axis; said second member being rotatably mounted on a support, and said third member being mounted on a support for rotation therewith; both said second and third members being rotatable about a second axis parallel to and displaced from said first axis; cam and follower means interlocking said first and second members for translating movements of said first to said second members; resilient means interposed between said second and third members yieldably interlocking the latter members for relative rotative movement therebetween; control handle means rotatably mounted on a support and pivotally connected to said first member and operative for selectively positioning said members in any one of a plurality of rotatively displaced settings.

References Cited
UNITED STATES PATENTS 2,932,948    4/1960    Neff et al. _____ 60—52
3,003,309    10/1961    Bowers et al. _____ 60—53 X EDGAR W. GEOGHEGAN, *Primary Examiner.*